(12) United States Patent
Morey

(10) Patent No.: X95
(45) Date of Patent: Mar. 25, 1795

(54) BOILER,STEAM/APPLYNGSTEAM

(76) Inventor: Samuel Morey

DRAFTSMAN'S DIVISION.
*All communications should be addressed to*
"The Commissioner of Patents,
Washington, D. C."

2—328 a.

*DEPARTMENT OF THE INTERIOR,*

United States Patent Office,

*Washington, D. C.,* / / *, 189*

*SIR:*

*The printed* copies *of Patent No.* Samuel Morey are *exhausted.* Mar 25, 1795

*As soon as printed a copy will be mailed you to complete your order.*

*By direction of the Commissioner:*

*Very respectfully,*

*Chief Clerk.*

3143b6-97-5m